(12) United States Patent
Lindeman et al.

(10) Patent No.: US 10,748,134 B2
(45) Date of Patent: Aug. 18, 2020

(54) SYSTEM AND METHOD FOR MANAGEMENT OF PAYEE INFORMATION

(71) Applicant: Visa International Service Association, San Francisco, CA (US)

(72) Inventors: Chantel Alison Lindeman, Cape Town (ZA); Scott John Wilson, Cape Town (ZA)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 277 days.

(21) Appl. No.: 15/504,615

(22) PCT Filed: Oct. 5, 2015

(86) PCT No.: PCT/IB2015/057604
§ 371 (c)(1),
(2) Date: Feb. 16, 2017

(87) PCT Pub. No.: WO2016/055919
PCT Pub. Date: Apr. 14, 2016

(65) Prior Publication Data
US 2017/0270511 A1 Sep. 21, 2017

(30) Foreign Application Priority Data
Oct. 9, 2014 (ZA) .............................. 2014/07318

(51) Int. Cl.
*G06Q 20/32* (2012.01)
*G06Q 20/38* (2012.01)
*G06Q 20/40* (2012.01)

(52) U.S. Cl.
CPC ......... *G06Q 20/3274* (2013.01); *G06Q 20/32* (2013.01); *G06Q 20/3276* (2013.01); *G06Q 20/385* (2013.01); *G06Q 20/401* (2013.01)

(58) Field of Classification Search
CPC ................................ G07D 11/32; G07F 19/00
(Continued)

(56) References Cited

U.S. PATENT DOCUMENTS

2004/0210520 A1\* 10/2004 Fitzgerald .............. G06Q 20/04
705/40
2006/0000900 A1\* 1/2006 Fernandes .............. G06Q 20/04
235/380

(Continued)

OTHER PUBLICATIONS

International Search Report / Written Opinion, dated Feb. 3, 2016, in PCT Application No. PCT/IB2015/057604, 10 pages.

*Primary Examiner* — Edwyn Labaze
(74) *Attorney, Agent, or Firm* — Kilpatrick Townsend & Stockton LLP

(57) ABSTRACT

A system and method is provided for management of payee information. The method is performed at a management application on a mobile communication device and includes: receiving a token including information relating to a payee, the information including payment information enabling processing of a transaction to a financial account of the payee; storing the token or extracted payment information from the token in association with the management application; and transferring the payment information to a payment application operating on the mobile communication device, the payment application operable to process payment to the payee using the payment information. The payment information for each of multiple payees is stored and transferred to a payment application when required.

18 Claims, 9 Drawing Sheets

(58) Field of Classification Search
USPC .................. 235/379, 375, 487, 382, 383
See application file for complete search history.

(56) References Cited

U.S. PATENT DOCUMENTS

| | | |
|---|---|---|
| 2008/0010215 A1 | 1/2008 | Rackley, III et al. |
| 2009/0081989 A1* | 3/2009 | Wuhrer .................. G06Q 20/10 |
| | | 455/406 |
| 2010/0299212 A1* | 11/2010 | Graylin .................. G06Q 20/32 |
| | | 705/14.66 |
| 2011/0040686 A1 | 2/2011 | Carlson |
| 2012/0041877 A1* | 2/2012 | Rao ...................... G06Q 20/108 |
| | | 705/43 |
| 2013/0060680 A1 | 3/2013 | Oskolkov et al. |
| 2013/0159170 A1* | 6/2013 | Gandhi .................. G06Q 40/02 |
| | | 705/39 |
| 2013/0290177 A1 | 10/2013 | Milam et al. |
| 2014/0149285 A1* | 5/2014 | De ...................... G06Q 20/3276 |
| | | 705/41 |
| 2014/0244482 A1 | 8/2014 | Joa et al. |
| 2014/0344153 A1* | 11/2014 | Raj .................... G06Q 20/3821 |
| | | 705/44 |
| 2014/0358796 A1* | 12/2014 | Smets .................. G06Q 20/327 |
| | | 705/76 |
| 2015/0081554 A1* | 3/2015 | Wong .................. G06Q 20/401 |
| | | 705/44 |
| 2016/0012416 A1* | 1/2016 | Sharma ................ G06Q 20/346 |
| | | 235/380 |
| 2016/0379204 A1* | 12/2016 | Zeitoun .............. G06Q 20/3276 |
| | | 705/40 |
| 2017/0048240 A1* | 2/2017 | Chang .................... G06F 21/32 |
| 2017/0178097 A1* | 6/2017 | Karnik ............. G06K 19/06037 |

\* cited by examiner

SYSTEM AND METHOD FOR MANAGEMENT OF PAYEE INFORMATION

CROSS-REFERENCE TO RELATED APPLICATION

This application is the U.S. National Phase of PCT Application No. PCT/IB2015/057604, filed Oct. 5, 2015, which claims the benefit of South African provisional patent application number 2014/07318, filed on Oct. 9, 2014, which are all incorporated by reference in their entirety for all purposes.

FIELD OF THE INVENTION

This application relates to the field of management of payee information; in particular for use by payment applications provided on mobile communication devices.

BACKGROUND TO THE INVENTION

The use of mobile communication devices (also referred to as mobile devices), to facilitate payments is increasing along with the increase in mobile device usage. Several different systems and methods have been proposed and/or implemented, with varying levels of success.

The use of mobile devices for payments is driven, at least partially by the fact that users' mobile devices are typically always on their person, allowing them to process payments as and when required. Financial institutions often provide a mobile banking application, also referred to as a payment application, which users can install on their mobile devices to enable them to transact therefrom.

Adding a payee on a mobile device, especially on a payment application, may be cumbersome and/or inconvenient to a user, as it typically involves entering various details of the payee which may be relatively difficult to do on a mobile device.

Additionally, the user may be required to enter a one-time passcode or the like which may be sent to the user via an out-of-band communication format. Some payment applications may not allow a user to minimize the application to access the one-time passcode received out of band, which may further complicate this for the user.

Furthermore, some users have financial accounts at various financial service providers. As each financial service provider typically has their own unique payment application or payment system which they support and/or allow, a user with multiple financial accounts may require more than one application on their mobile device. Additionally, if a user wishes to pay a payee from more than one account, the user may have to individually associate the payee with every payment application in order to process payment to that beneficiary.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with the invention there is provided a method for management of payee information, the method performed at a management application on a mobile communication device and including the steps of: receiving a token including information relating to a payee, the information including payment information enabling processing of a transaction to a financial account of the payee; storing the token or extracted payment information from the token in association with the management application; and transferring the payment information to a payment application operating on the mobile communication device, the payment application operable to process payment to the payee using the payment information; wherein payment information for each of multiple payees is stored and transferred to a payment application when required.

A further feature provides for the method to include the step of storing the token or extracted payment information from the token on a secure storage element associated with the mobile communication device. Optionally, the extracted payment information may be stored in a format accessible by an authorized mobile application.

A still further feature provides for the method to include extracting the payment information from the token by decrypting and/or analyzing the token.

Yet further features provide for the method to include the step of, prior to transferring the payment information, encrypting the payment information; alternatively for the method to include the step of, prior to transmitting the payment information, establishing a secure communications channel with the payment application.

Further features provide for the method to include comparing a token or extracted payment information from the token with an existing stored token or extracted payment information, and updating the stored token or extracted payment information if different.

A further feature provides for extracting the payment information from the token by decrypting and/or analyzing the token. The extracted payment information may be stored in a standardized format for the management application or in a format accessible by a payment application.

A further feature provides for transferring the payment information to a payment application including formatting and/or encrypting the payment information according to requirements of the payment application.

Yet further features provide for the method to include receiving a request for payment information of a payee from the payment application operating on the mobile communication device; alternatively, to include instigating a payment to a payee from the management application including receiving selection of a payment application and transferring the payment information for the payee to the payment application.

Still further features provide for the token to be a graphical code encoding an account number and one or more of the group of: a name of the payee, a city of the payee, a country of the payee, a currency of the transaction, a payment amount. Further features provide for the method to include generating a graphical code to encode payment information of a user of the management application for providing to another user.

Still further features provide for the token to include any one or more of: an account number; a bank identification number; a branch identification number; and a mobile phone number.

A further feature extends to the method extracting at least the payment information from the token including extracting a name or identifier of the payee and referencing the payment information by the name or identifier.

A further feature extends to the method including mapping names or identifiers of payees from payment applications to names or identifiers stored at the management application.

A further feature extends to the method including registering one or more payment applications with the management application including receiving format and/or encryption requirements for the payment application.

Yet further features extend to receiving a token from a source outside the mobile communication device using a receiving component of the mobile communication device or receiving a token from another component within the mobile communication device.

The invention extends to a system for management of payee information using a mobile communication device comprising: a receiving component for receiving a token including information relating to a payee, the information including payment information enabling processing of a transaction to a financial account of the payee; a storing component for storing the token or extracted payment information from the token in association with a management application; and a transferring component for transferring the payment information to a payment application operating on the mobile communication device, the payment application operable to process payment to the payee using the payment information; wherein payment information for each of multiple payees is stored and transferred to a payment application when required.

Further features provide for the management application to be embedded in a payment application.

Further features extend to the storing component for storing the token or extracted payment information from the token storing on a secure storage element associated with the mobile communication device; the storing component may store extracted payment information in a standardized format for the management application, or a format accessible by a payment application.

A further feature extends to the system including an extracting component for extracting the payment information from the token by decrypting or analyzing the token.

A further feature extends to the transferring component for transferring the payment information to a payment application including a formatting component for formatting and/or encrypting the payment information according to requirements of the payment application.

A further feature extends to the system including a secure communications component for establishing a secure communications channel with the payment application before transmitting the payment information.

A further feature extends to the system including a request component for receiving a request for payment information of a payee from the payment application operating on the mobile communication device.

A further feature extends to the system including a prompting component for instigating a payment to a payee from the management application including receiving selection of a payment application and transferring the payment information for the payee to the payment application.

A further feature extends to the system including a name component for referencing the payment information by a name or an identifier obtained from or received with the token.

A still further feature extends to the system including a name mapping component for mapping names or identifiers of payees from payment applications to names or identifiers stored at the management application.

A further feature extends to the system including a registering component for registering one or more payment applications with the management application including receiving format and/or encryption requirements for the payment application.

Further features extend to the receiving component for receiving a token to include receiving a token from a source outside the mobile communication device using a receiving component of the mobile communication device or receiving a token from another component within the mobile communication device.

Further features provide for the system to include an encoding generating component for generating a graphical code encoding payment information of a user of the management application.

The invention also extends to a computer program product for management of payee information using a mobile communication device, the computer program product comprising a computer-readable medium having stored computer-readable program code for performing the steps of: receiving a token including information relating to a payee, the information including payment information enabling processing of a transaction to a financial account of the payee; storing the token or extracted payment information from the token in association with a management application; and transferring the payment information to a payment application operating on the mobile communication device, the payment application operable to process payment to the payee using the payment information; wherein payment information for each of multiple payees is stored and transferred to a payment application when required.

Further features provide for the computer-readable program code to be non-transitory and for the computer-readable program code to be executable by a processing circuit.

Aspects of the invention will now be described, by way of example only, with reference to the accompanying drawings.

DETAILED DESCRIPTION WITH REFERENCE TO THE DRAWINGS

Systems and methods for management of payee information are described. The method may be performed on a mobile communication device, which may include communication devices such as a mobile or cell phone, or other forms of mobile computing device which may be used for communication and payment transactions. The mobile communication device may be referred to as a mobile device herein.

A beneficiary management application is described which executes on the mobile communication device. The beneficiary management application may be linked to a financial institution, a payment processing network, or may be an independently provided application which enables the receipt, management and use or transfer of payee information in a centralized manner for a user. Multiple banking, financial or money transfer applications (generally referred to as payment applications) on a user's mobile device may make payment transactions for which payee information is required. The beneficiary management application may provide a central repository for payee information which can be transferred to payment applications when required.

The management of payee information by the beneficiary management application includes receiving a token providing information relating to a payee including payment information enabling processing of a transaction to a financial account of the payee. The information may be extracted from the token, and presented or transferred to a payment application installed on the mobile device. The payment application is then able to process payment to the payee using the payment information received.

When processing payments from an online or application-based payment portal of a financial institution, a user is typically required to add a potential payee as a "beneficiary" on their online banking platform in order to initiate payment to that payee. A beneficiary may be any entity which has a financial account to which payments may be made, including, but not limited to, merchants, individuals, groups, organizations, and the like. A beneficiary may be a one-time beneficiary, typically used for one-time payments, or may be a recurring beneficiary. Recurring beneficiaries are typically added to a list accessible on the online payment portal so that a user may select a recurring beneficiary when the user wishes to make a further payment to that beneficiary. In the remainder of the specification, the term "beneficiary" should be construed to mean any payee to which payment may be made.

Figure 1:
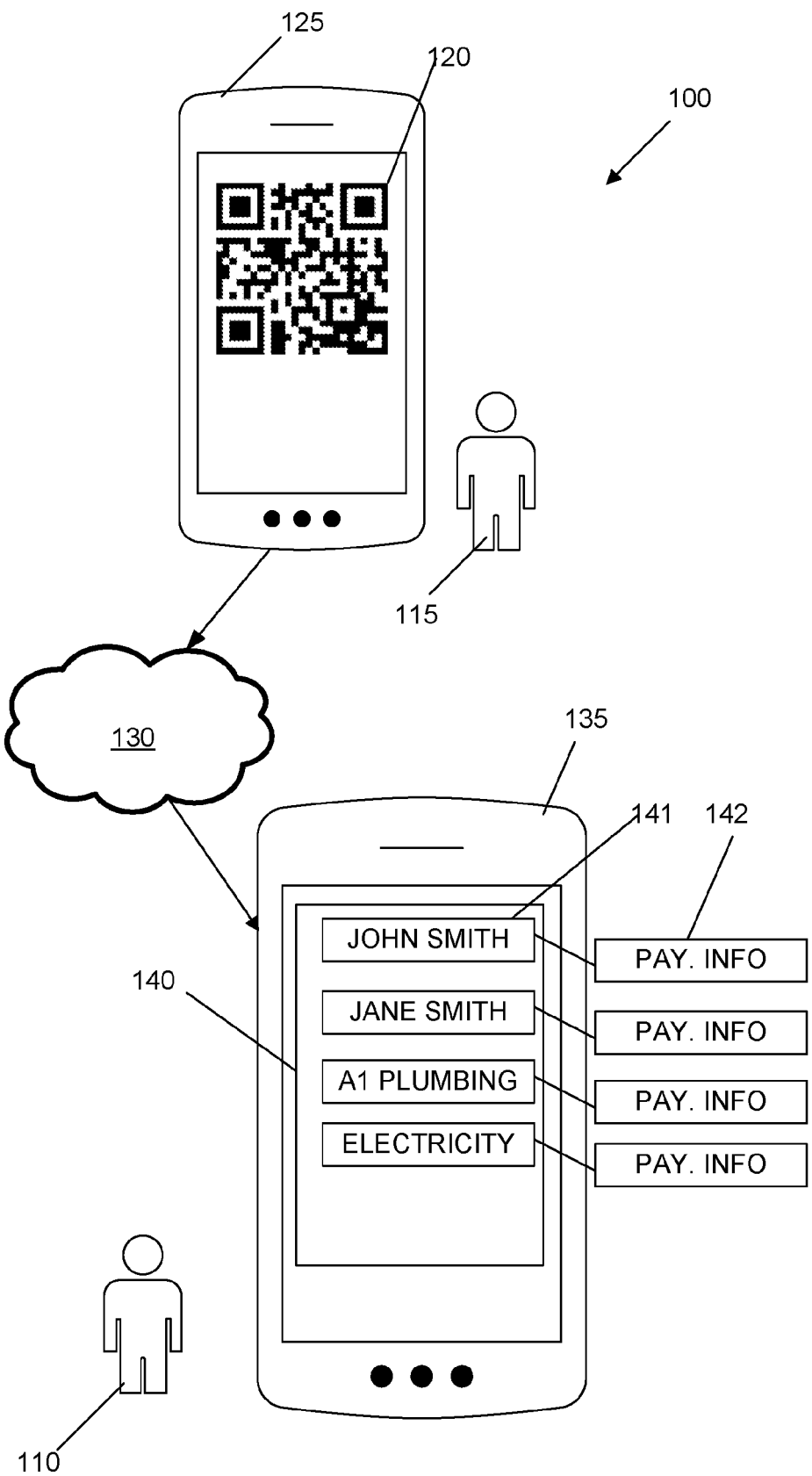
FIG. 1 shows an example embodiment of a system for management of payee information in accordance with the present invention.

FIG. 1 shows an example system (100) for management of payee information in accordance with an embodiment of the invention. A user (110) wishes to transfer money to a payee (115), who is not listed as a beneficiary associated with any of the user's financial accounts. The payee (115) transfers a token (120) stored or generated on their mobile device (125) to the user's mobile device (135).

The token may be any suitable data element replacement which represents at least payment information of a payee, and may also include additional information relating to the payee, a financial institution at which the payee has an account to which the payment information relates, and the like.

The token may be in any suitable format including, but not limited to, a graphical format such as a bar code, whether one-dimensional or two-dimensional, or the like. A graphical format of a token may be transferred between a payee's mobile device (125) and the user's mobile device (135) via suitable means available at the user's mobile device (135). As an example, the payee (115) may display their graphical format token for capture by a scanning application or camera of the user's mobile device (135). As another example, the graphical format token may be transferred via a form of communication, such as email, or messaging services.

Another form of suitable format may be a non-graphical format of information encoding which is transferable by wireless communication such as near field communication (NFC). An example of such a non-graphical format may be an NFC tag transferable between devices.

In the present described embodiment, the token is a two-dimensional barcode in the form of a Quick Response (QR) code. The QR code may encode the following information: a personal account number (PAN); a payee's name, a city name, a country code, and a transaction currency code. In some embodiments, the QR code for the payee may be dynamic in that there is an additional field which may be varied for a transaction amount. If such a dynamic QR code is received by a beneficiary management application, the static information may be checked against an existing record for the payee and updated if required. The payment transaction amount may be used for a current payment.

The beneficiary management application may also include a token generating component for generating a token for the user of the mobile device encoding their payment information for sending to other users. In this case, the user becomes a payee of the other users.

It will be apparent to a person skilled in the art that the token may be received via any suitable communication method (130), including, but not limited to, optical scanning, capture or reading, email, multi-media messaging (MMS), Bluetooth, Wi-Fi, infra-red, NFC, or the like. Some forms of communication, particularly email and MMS, may allow information to be received from a payee located a significant distance away from the user. The beneficiary management application may receive or retrieve a token from a different application operable on the user's mobile device, for example an email management application if the token is received via email.

A beneficiary management application operates on the user's mobile device (135) and facilitates operation of the system and method. The user's mobile device (135) receives the token (120), and the beneficiary management application may store the token (120) or extracted payment information (142) in a storage element accessible only by the beneficiary management application. The storage may be temporary, for example, before transferring this to a payment application.

The beneficiary management application may extract or receive an identifier (141) of the payee (115), in the present embodiment the payee's name, from the token. The identifier (141) of the payee (115) may be displayed in a beneficiary list (140) managed by the beneficiary management application. Payment information (142) for enabling a payment to the payee (115) may be referenced and accessed via the identifier (141) in the beneficiary list (140). It should be noted that an identifier of the payee need not be extracted from the token, but may be entered by the user. Alternatively, the user may be allowed to alter an extracted identifier of the payee in order to assist them in processing payment to the correct payee.

In the present embodiment, the user's mobile device has a plurality of mobile payment applications installed thereon, although in other embodiments, only one payment application may be provided on the mobile device. Each payment application may be associated with a financial institution at which the user has at least one financial account. Payments from the user's financial account may be made using the relevant payment application. In order to process payment to a payee (115), the user (110) may select the payee from the beneficiary list (140) accessible from the beneficiary management application. The user (110) may also select which mobile payment application installed on the mobile device they would like to use to transfer money to the payee (115).

The beneficiary management application may analyse the token (120) to extract the payment information contained therein, and may present the selected payment application with the payment information required to process payment to the payee (115). The payment application may then process payment to the payee, using the payment information, in any way known in the art. This may involve that a financial institution of the user (110) transfers the selected amount from an account of the user to a financial institution of the payee (115) for addition to a financial account of the payee (115).

It is envisaged that at least some of the information required to process the transaction, for example the payment amount, will need to be separately entered by the user. Furthermore, a user with more than one financial account associated with a specific payment application may need to select which of the more than one financial accounts they would like to transfer money from in addition to selected the payment application to use.

Figure 2A:
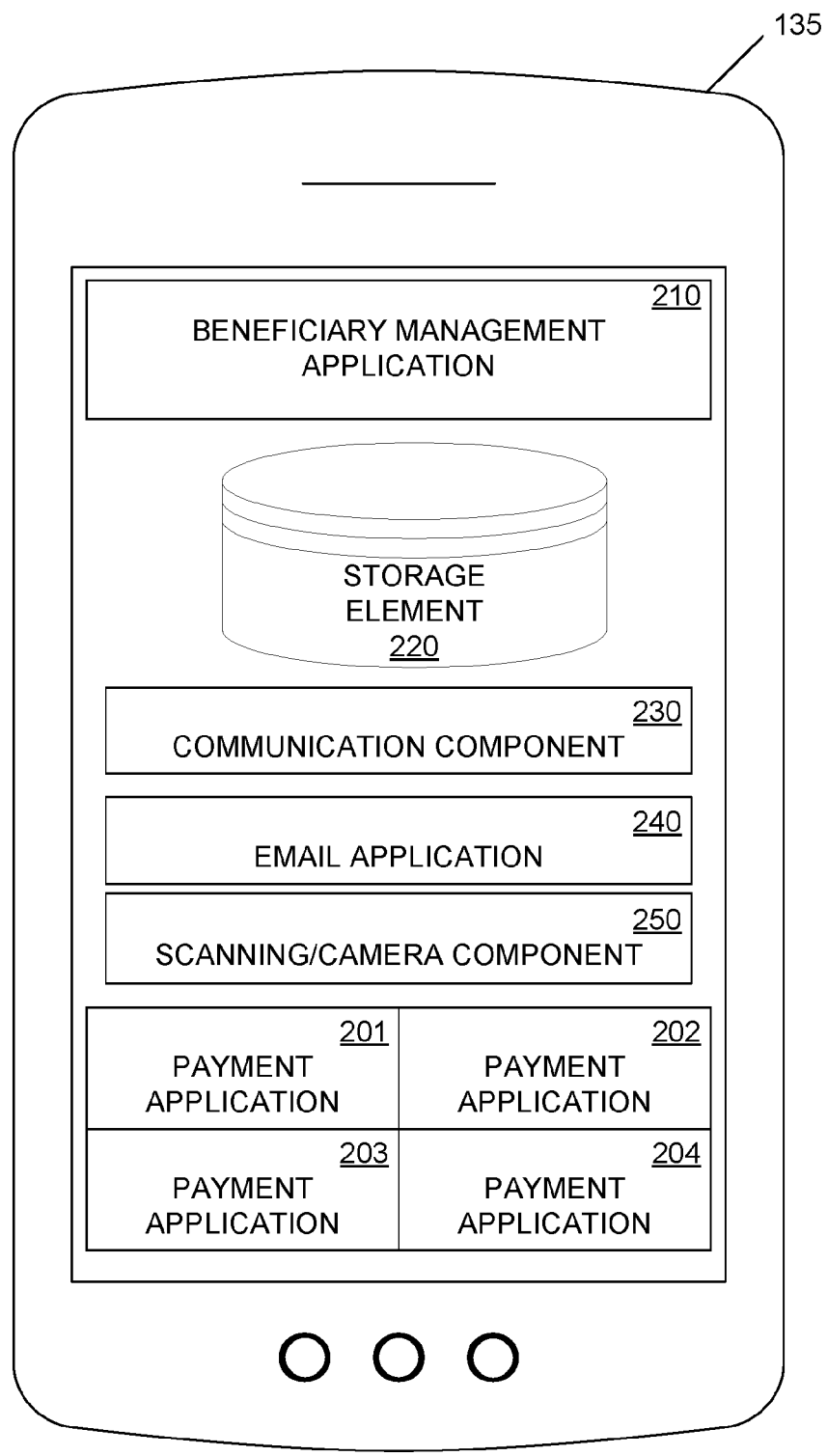
FIGS. 2A and 2B show an example embodiment of a mobile device for use in the system of FIG. 1.

FIG. 2A shows an example embodiment of a mobile device (135) of a user for use in the system (100) of FIG. 1. The mobile device (135) includes a beneficiary management application (210) with an associated storage element (220) at which beneficiary or payee information may be stored.

The storage element (220) may be contained within the beneficiary management application (210) or provided as a separate element with secure communication and data transfer with the beneficiary management application (210). The storage element (220) may store a token in the form it is received by the beneficiary management application (210) and/or it may store payee information extracted from the token. The storage element (220) may store on behalf of the beneficiary management application (210) a secure list of payees and their payment information which may be accessed by multiple payment applications (201-204) on the mobile device (135). A payee's payment information may be updated and kept current in the storage element (220) without need to update individual records in payment applications.

The beneficiary payment application (210) may be embedded in one or more of the payment applications (201-204) as a third-party addition to the payment application (201-204). The beneficiary payment application (210) may be a dedicated payee directory application or may be incorporated into a payment application. In one embodiment, the beneficiary payment application (210) may be provided by a payment processing network which is used by the banking institutions to which the payment applications (201-204) belong. The beneficiary payment application (210) may provide a payment transaction method which may be built in or used by the payment applications (201-204).

FIG. 2A also shows additional components of the mobile device (135) which may interact with the beneficiary management application (210) to receive tokens. The additional components may include a communication component (230) which may enable communication to and from the mobile device (135) using different communication methods; one example, is an email application (240) that may be provided for receiving a token via an email communication. The additional components may also include a scanning or camera component (250) of the mobile device (135) which may capture a token provided in the form of a graphical format.

Figure 2B:
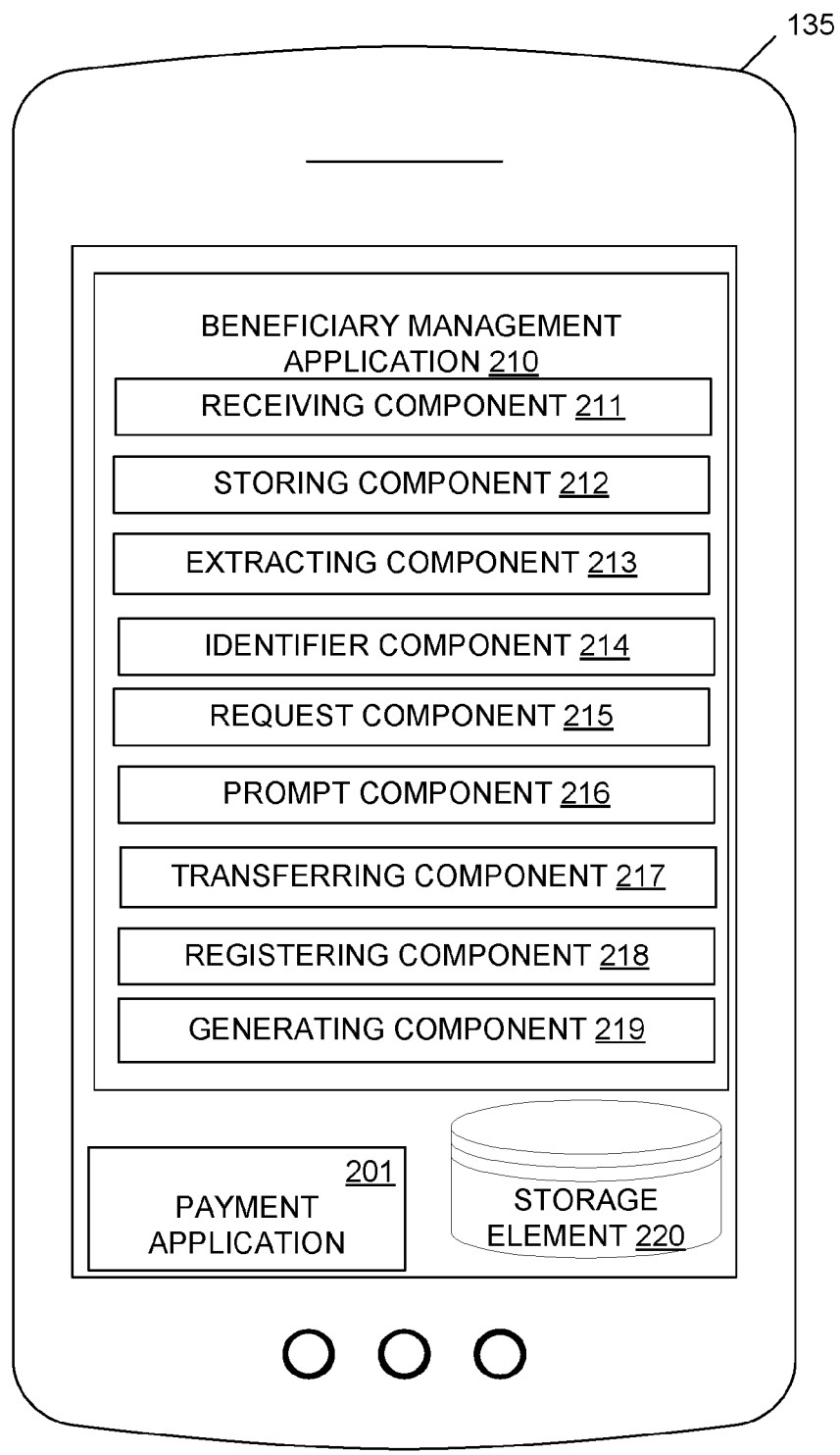

Referring to FIG. 2B, further details are shown of the example embodiment of a mobile device (135) of a user for use in the system (100) of FIG. 1. The mobile device (135) may include a processor or microprocessor and memory configured to provide computer instructions. The beneficiary management application (210) may be executable on the mobile device (135) as computer instructions and may manage and operate various components in the form of software units providing the described functionality of the components. The beneficiary management application (210) may include the following components.

A receiving component (211) may be provided for receiving a token at the beneficiary management application (210). The receiving component (211) may receive the token directly from an external device such as a payee's mobile device via a communication mechanism of the receiving component (211) or may receive the token from another source within the mobile device (135). A storing component (212) may manage the storing of the token at a storage element (220) as shown in FIG. 2A. The token may be stored in its encoded form as a token, or the payment information in the token may be extracted by an extracting component (213) and the extracted payment information may be stored in the storage element (220). The extracted information may be encrypted for secure storage at the storage element (220).

For example, in the case of a token in the form of a QR code, the extracting component (213) may extract the encoded information and store this in appropriate fields in a payee record in the storage element (220). Additionally, or alternatively, the QR code itself may be stored as a reference, for comparison to a newly received QR code for the same payee, or for forwarding to other users, if authorised. If no extracted information is stored at the storage element (220), the extraction component (213) may extract the payee information at a time of transfer of the payee information and the extracted information may not be stored. Similar arrangements may be used for other forms of encoding.

The storing component (212) may further encrypt the extracted payee information before storage at the storage element (220) in order to provide increased security.

The receiving component (211), storing component (212), and extracting component (213) may be configured to accept, store and extract various different encodings of the payee information. For example, some payee's may provide their payee information as a QR code, whilst others may use a NFC tag, or other format.

An identifier component (214) may be provided for associating payee information with a payee or beneficiary identifier such as a name. A name or other form of identifier may be generated when a token is received from a payee for the first time and may be extracted from the token, may be sent in association with the token, may be retrieved from a user's contact list of the mobile device, or may be input by the user manually through an input interface. The identifier component (214) may be linked to an address book or contact list stored on the mobile device (135). The identifier component (214) may include an identifier mapping component for mapping similar or overlapping names or identifiers to beneficiaries and prompting user input if records having duplicate, similar or overlapping names are located.

A request component (215) may be provided for receiving a request from a payment application (201) for a payee's information in order for the payment application (201) to make a financial payment to the payee. The identifier component (214) may be used to locate a record of a correct payee in the case that the payment application (201) uses a different name or identifier.

A prompt component (216) may be provided for prompting a payment transaction from the beneficiary management application (210). Such a prompt component (216) may provide a selection interface for the payee and the payment application (201) to be used for the payment. The payment application (201) may then be activated with the payee information provided.

A transferring component (217) may be provided for transferring or presenting payee payment information to a payment application (201). The transferring component (217) may transfer the information in a format specific to the payment application (201), for example with the required fields and in a required format. The payment application (201) requirements may be registered via a registering component (218) of the beneficiary payment application (210) which registers payment applications (201) and their format requirements.

The transferring component (217) may transfer the payment information in a secure form, such as encrypted form, or by establishing a secure communication channel between the beneficiary management application (210) and the payment application (201). Inter-application communications may be used such as protocol handlers to enable communication and data exchange between the applications using uniform resource identifiers (URIs), intents, services or other methods.

A generating component (219) may be provided for generating an encoding of payment information on behalf of the user. The user may wish to provide their payment information to another user and may encode their information, for example, in a QR code or NFC tag for transfer. In addition, a trusted user may generate an encoding of a payee's information for transfer to another user.

Figure 3:
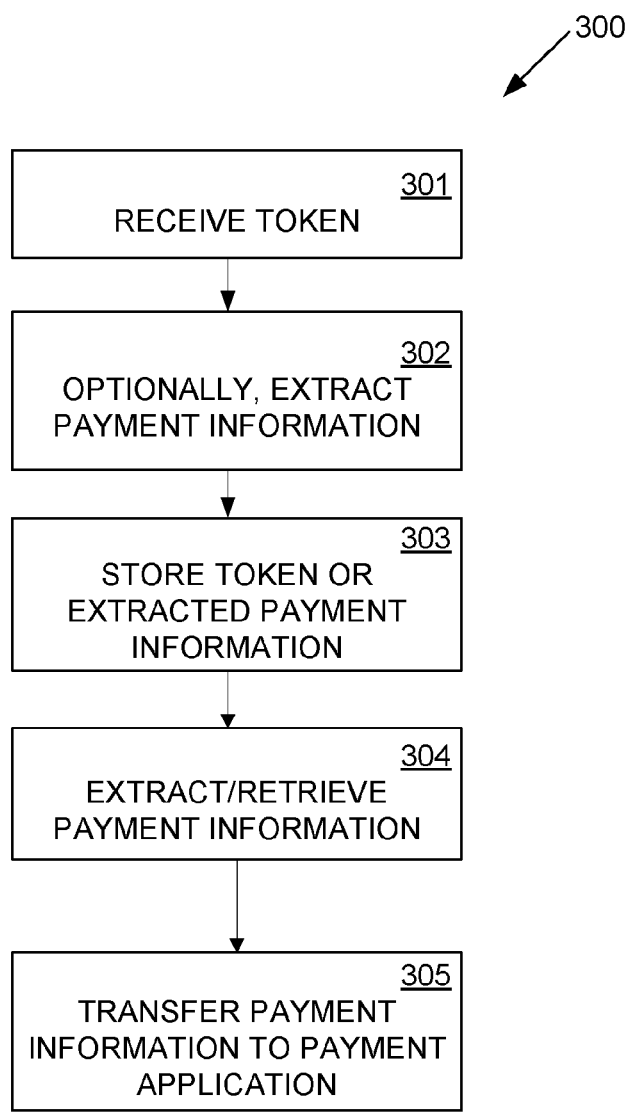
FIG. 3 is a flow diagram of an example embodiment of a method in accordance with the present invention.

Referring to FIG. 3, a flow diagram (300) shows an embodiment of a method of management of payee information as carried out by the beneficiary management application (210) of FIGS. 2A and 2B.

A beneficiary management application (210) and one or more payment applications (201-204) may be installed on the user's mobile device (135). Each payment application (201-204) may be associated with a financial institution at which the user has a financial account and is configured to allow payments from that account.

In a first step (301) of the method, the beneficiary management application (210) may receive a token which includes information relating to a payee. The information is received by the receiving component (211), and includes payment information required to enable payment to the payee.

In a next step (302), the beneficiary management application (210) may optionally extract the payment information from the token or, alternatively, the token may remain encoded.

The method may store (303) the token or the extracted payment information in a storage element (220) associated with the mobile device, using the storing component (212). The token may be stored in the original format in which it was received, which is only readable by the beneficiary management application. Alternatively, the extracted information may be encrypted for secure storage. The storage element may only be accessible by the beneficiary management application. An identifier of the payee may be added to a beneficiary list, which enables the user to select the payee from the beneficiary list in order to initialize payment to them.

In a next step (304), and in response to the user indicating that they wish to make a payment to a payee, the mobile device may extract the payment information if the token is stored in encoded form or retrieve the payee information from the storage element. The user may select the payee that they wish to pay from the list of beneficiaries.

In a final step (305), the payment information is transferred or presented to a payment application (201) selected by the user, using the transferring component (217). The payment information may only be presented to the selected payment application or to a payment application from which a request for payee information has been received. The payee information may be formatted according to the requirements of the payment application (201). The payment application (201) is then able to process payment to the payee for an amount that the user provides from the financial account of the user associated with the selected payment application (201).

The payee information may include a variety of information in addition to the payment information suitable to enable processing a transaction to the payee. The payment information may include an issuer identifier, an account identifier, a name of the payee or an issuer, a card security code, address and country information, currency information, and the like.

Figure 4:
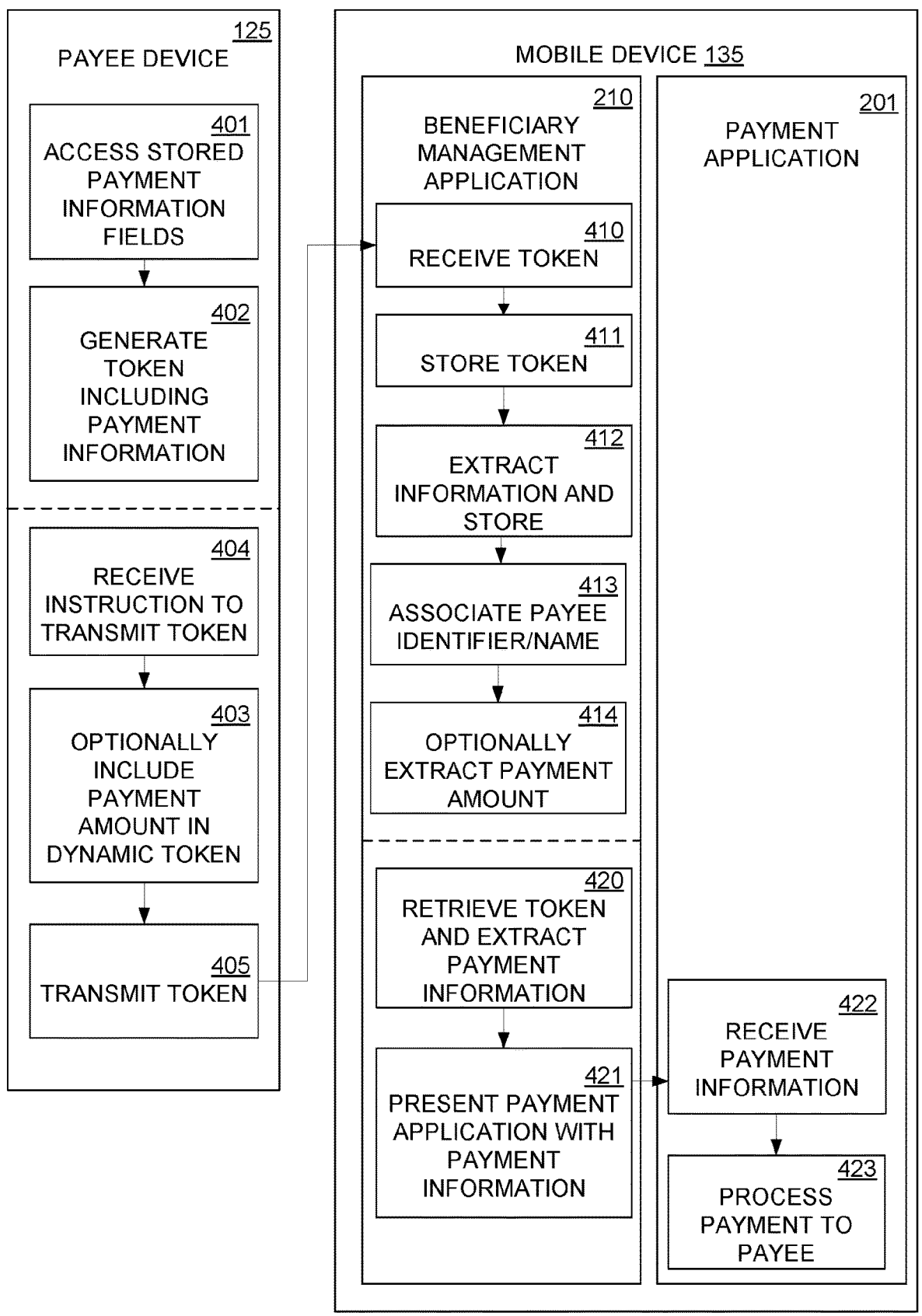
FIG. 4 is a swim-lane flow diagram illustrating an example embodiment of a method in accordance with an aspect of the invention.

Referring to FIG. 4, a swim-lane flow diagram illustrates the steps involved in processing payment to a payee as carried out by a payee device (125) and a user or payor mobile device (135) having a beneficiary management application (210) and a payment application (201) installed thereon. The payee device may be a mobile device of the form of the payor mobile device, or alternatively may take the form of a non-mobile device as it may be a stationary device, such as that of a retail merchant. In this example, a payee mobile device (125) is referred to.

A payee mobile device (125) may have a component installed on the device for generating and/or supplying payment information to another device, such as a payor mobile device (135). The payee mobile device component may be a beneficiary management application as described herein which may include functionality to generate and supply a token to another beneficiary management application on a separate device. The payee mobile device (125) may include stored payment information for the owner of the device or an entity over which the owner or the device has authorization.

The payee mobile device (125) may access (401) the stored payment information which may be provided in fields and may generate (402) a token encoding the payment information. As described above the token may be a QR code, an NFC tag, or other form of graphical or non-graphical encoding of the payment information suitable for transfer between devices.

The payee mobile device (125) may receive (404) an instruction to transmit a token providing payment information to a payor's mobile device (135). In one embodiment, the token may be generated including a variable payment amount, for example, in a dynamic QR code. In other embodiments, the token may be a static token in which only the static payment information is encoded for use in multiple payment transactions. The token may be transmitted (405) to the payor mobile device (135).

The payor mobile device (135) may receive the token via multiple possible communication methods and may internally transfer the token to the beneficiary management application (210) if received by a component external to the beneficiary management application (210) on the mobile device (135), such as an email application, scanner, camera or NFC receiver.

The beneficiary management application (210) may receive the token (410) and, in one embodiment, may store the token in its token form at a storage element associated with the beneficiary management application (210). In another embodiment, the beneficiary management application (210) may extract (412) the payment information and store this at the storage element in a form uniform to the beneficiary management application (210). The extracted payment information may be stored in an encrypted form for additional security or may be stored at a secure storage element.

The beneficiary management application (210) may store the token or the extracted payment information in a storage element associated with the mobile device (135). It is envisaged that the storage element may only be accessible to the beneficiary management application (210), or the token or extracted payment information may be stored in a format only readable by the beneficiary management application (210). An identifier of the payee may be provided so that the payee's token or extracted information may be located at a later time.

The stored token or payment information may be associated (413) with an identifier or name of the payee. This may be provided by various methods including: extracting the payee identifier from the token, receiving the payee identifier with the token or using the payee device's address from which the token is received as the identifier, as manually input by the user of the mobile device (135), via access to an address book or contacts list of the mobile device (135), etc. The identifier may be a mobile device phone number, an email address of the payee, a name, or other form of identifier.

It is further envisaged that a user identifier used to list payees in the list of beneficiaries need not be extracted from the payment credentials, but may be entered by a user at the time of receiving the credentials. This may allow information contained in a token to be extracted only upon payment to the payee.

If a dynamic token is received with a payment amount, the payment amount may be extracted (414) and applied to a current transaction. The remaining payment information in the token may be stored for future transactions.

If a token is received for which an existing token or extracted information for that payee is already stored, the stored token or extracted information may be replaced with the new information. A prompt may be activated to the user to confirm if the replacement should be made.

Figure 5:
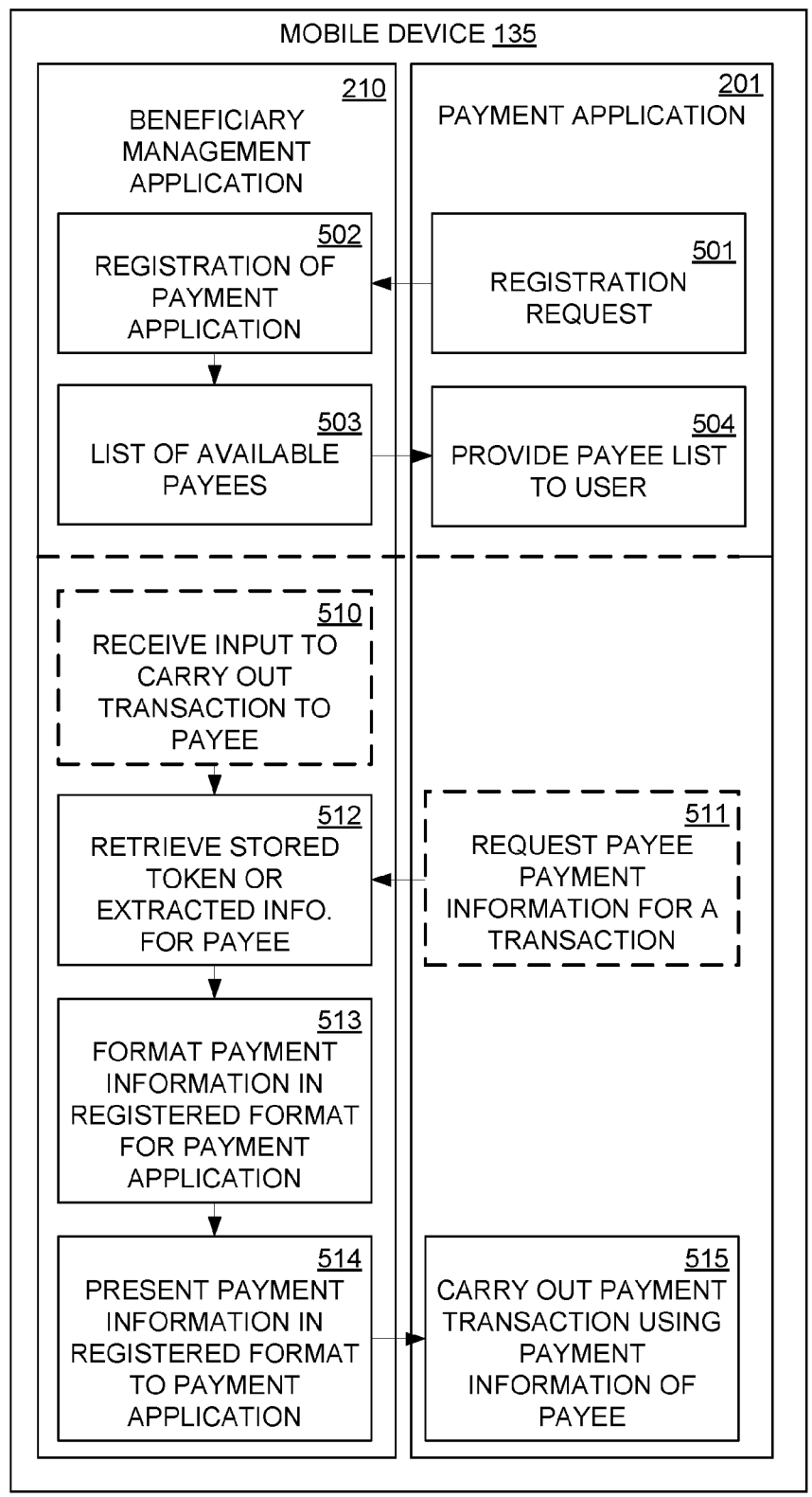
FIG. 5 is a swim-lane flow diagram illustrating an example embodiment of a method in accordance with an aspect of the invention.

The beneficiary management application (210) may retrieve (420) the token or extracted information for use in a transaction as described further in relation to FIG. 5. The payment information may be presented (421) to a payment application (201) which may receive (422) the payment information and process a payment (423) to the financial account of the payee using the payment information. In one embodiment, the beneficiary payment application (210) may be incorporated into or embedded into the payment application (201).

In a further embodiment, a token need not be stored, but may only be used once. This embodiment may be referred to as a once-off payment. In such an embodiment, a mobile device will receive a token, extract payment information therefrom, and present the payment information to a payment application. The step of storing the payment information may not be required. The token may be deleted as soon as the payment application has been provided with the payment information.

Referring to FIG. 5, a swim-lane flow diagram illustrates an embodiment of an aspect of the described method carried out at a mobile device (135) of a user for use in the system (100) between a beneficiary management application (210) and a payment application (201) both of which may operate on the mobile device (135). In one embodiment, the beneficiary management application (210) may be embedded in the payment application (201) or associated with it in a manner that secure communication may take place between the applications (210, 201).

The payment application (201) may register with the beneficiary management application (210) as a payment application (201) through which payments may be made to payees using the payee information stored by the beneficiary management application (210). The payment application (201) may send (501) a register request to the beneficiary management application (210). The register request may include details of the payment application and the fields of payee information required and any format or encryption of the payee information required by the payment application (201).

The beneficiary management application (210) may register (502) the payment application including the supplied information. The beneficiary management application (210) may supply (503, 504) a list of payees for which the beneficiary management application (210) holds payee information to the payment application (201) and this list may be updated.

At a time that the user wishes to process payment to a payee, the user may instruct the beneficiary management application (210) to process a payment and the beneficiary management application (210) may receive an input (510) to carry out a transaction payment to a payee. In one embodiment, the beneficiary management application (210) may receive the input or instruction by the user selecting the payee from a menu of stored beneficiaries. In another embodiment, the user may input a payee name and search may be carried out of stored payee names to find similar or matching names. In a yet further variation, the beneficiary management application (210) may be linked to a user's address book or contact list stored on the mobile device (135) which may link to the correct stored payee information.

If the payment transaction is instigated from the beneficiary management application (210), the user may select a payment application (201) from which the payment is to be made. This may be provided by a menu of registered payment applications (201).

In an alternative scenario, the user may instruct a payment application (201) to process payment to a payee, which in turn may be configured to request (511) payment information of a payee from the beneficiary management application (210). The payment application (201) may use a supplied payee list from the beneficiary management application (210) such as that provided at registration of the payment application (201) or as updated in order to provide a stored payee's name. Alternatively, the payment application (201) may provide a payee name which the beneficiary management application (210) may resolve with stored payee information by searching for similar payee names and may seek confirmation from the user if more than one stored payee name is similar to the requested payee.

The beneficiary management application (210) may retrieve (512) a token or extracted payee information associated with that payee from the stored payee information. If the payee information is stored in its token form the payment information may be extracted from the token. If the payee information is stored in its extracted form, this may just be retrieved.

If the instruction is received from the user, the user may indicate which payment application (201) installed on their mobile device (135) they would like to use to process payment to the payee. If the instruction is received from a payment application (201), then the beneficiary management application (210) will know which payment application (201) has requested the beneficiary details. The beneficiary management application (210) may access the registered information of the payment application (201) to determine any required payment information fields, formatting of the payment information, or method of transfer such as encryption or secure communication between the beneficiary management application (210) and the payment application (201). The required formatting (513) and communication method may be carried out.

The beneficiary management application (210) may transfer or present (514) the payment application (201) with the payment information. If the payment is instigated from the beneficiary management application (210) this may open the payment application (201) to start a payment transaction.

The payment application (201) may receive the payment information from the beneficiary management application (210) and the payment application (201) may use the payment information to process (515) payment from a financial account of the user associated with the payment application (201) to a financial account of the payee identifiable from the payment information.

It should be noted that additional steps may be included at the beneficiary management application (210) or the payment application (201), in particular a step of receiving, from the user, an indication as to the amount that they wish to transmit to the payee.

In the embodiment where the payment application (201) requests payment information from the beneficiary management application (210), the user may, from the payment application and at the time of selecting a payee, be provided access to the list of beneficiaries managed by the beneficiary management application (210). Upon selection of a payee from the list of beneficiaries, the beneficiary management application (210) may extract the payment information in the background, and present the payment information to the payment application (201) for further processing of payment to the payee.

An encryption component may be provided for encrypting payment information into a format readable by a payment application (201) operable on the mobile device. Payment information may then be encrypted before it is presented to the payment application (201), with only the payment application (201) able to decrypt and use the payment information. It is envisaged that providers of payment applications may propose a type of encryption unique to a specific application.

In an additional embodiment, the beneficiary management application (210) may be configured to establish a secure communications channel with the payment application (201) to ensure that the payment information is not intercepted by a rogue application such as malware operating on the mobile device. A secure communications channel establishing component may be used to establish such a secure communications channel.

Figure 6:
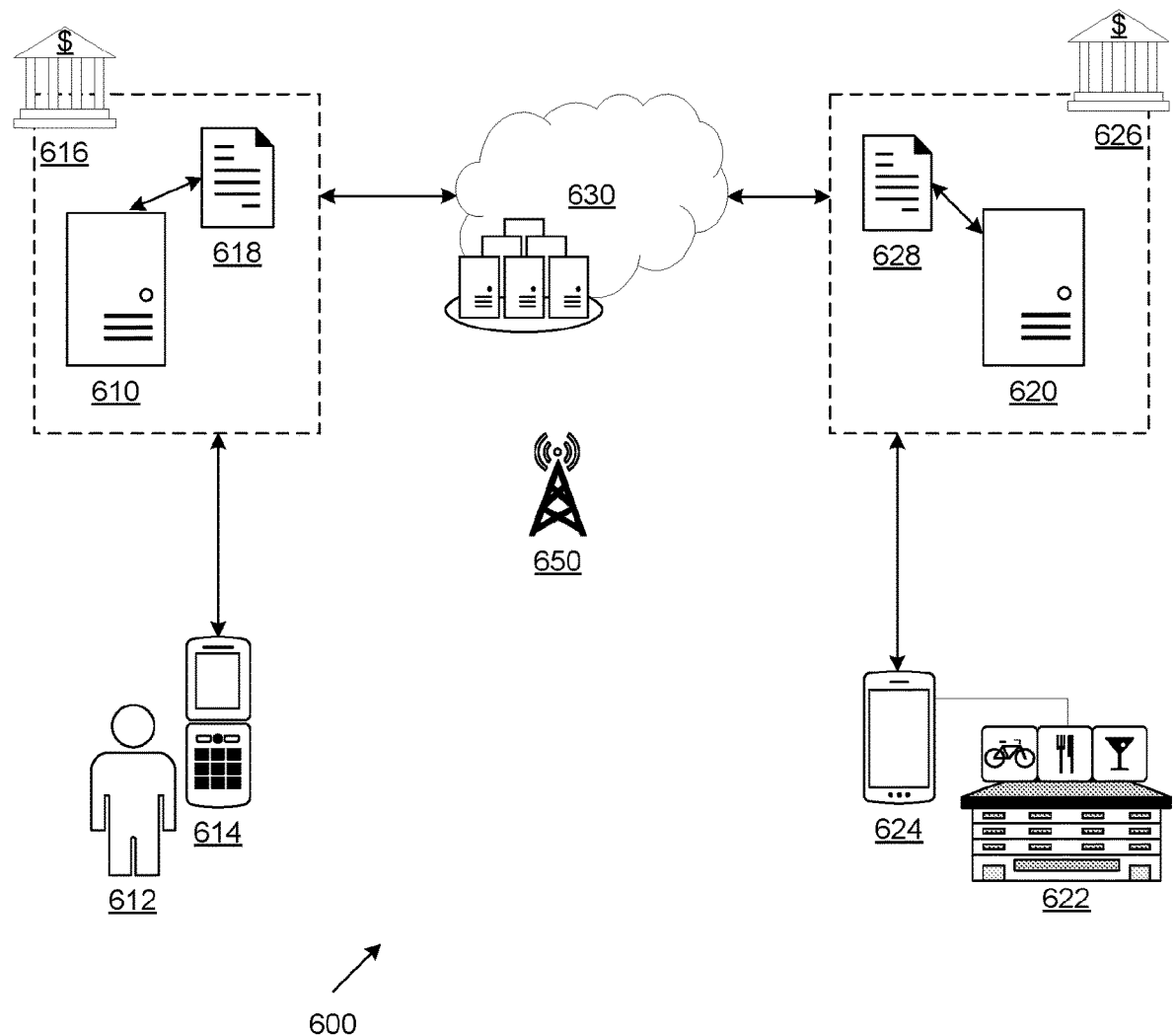
FIG. 6 is a schematic diagram of a payment system in which the disclosure may be implemented.

Referring to FIG. 6, a schematic diagram illustrates an exemplary system (600) for processing financial transactions using the described methods and systems. The system (600) includes a first server computer (610) associated with a first entity (612) and a second server computer (620) associated with a second entity (622). The first and second entity (612, 622) may also have a first entity device (614) and second entity device (624) respectively associated therewith. The first entity device (614) and the second entity device (624) may be mobile devices of a payor and payee as described herein.

The system (600) may also include a payment processing network (630) via which the first server computer (610) may transmit and receive financial system transaction messages to and from the second server computer (620).

The first and second server computers (610, 620) respectively may be any appropriate server computers, server computer clusters, distributed server computers, cloud-based server computers and the like. Each of the server computers (610, 620) may include a processor and a non-transitory computer readable medium comprising code executable by the processor to perform functions, such as generating messages, electronically receiving and transmitting messages or data, parsing messages or data, and the like. The server computers (610, 620) may be configured to transmit and receive financial system transaction messages (such as ISO 8583 messages), debit and credit financial accounts, transmit messages to and receive messages from the first and second devices (614, 624) respectively and the like. The first server computer (610) may be maintained or operated by financial institution (616) controlling a financial account (618) of the first entity. Similarly, the second server computer may be maintained or operated by another financial institution (626) controlling a financial account (628) of the second entity (612).

The first entity device (614) may be any appropriate mobile device capable of communicating over a mobile communication network (650). Exemplary mobile communications devices include: a mobile phone being either a feature phone or a smart phone; a tablet computer; a wearable computing device such as a smart watch or smart glasses; a personal digital assistant; a laptop computer and the like. The first entity device (614) may have a mobile application resident therein and installed thereon which may enable the first entity device (614) to transmit data messages to and receive data messages from the first server computer (610). In other embodiments, the first entity device (614) may exchange data messages with the first server computer (610) using Unstructured Supplementary Service Data (USSD) sessions or Short Messaging Service (SMS) messages via the mobile communication network (650).

The second entity device (624) may also be an appropriate mobile communications device capable of communicating over a mobile communication network (650) such as a mobile phone being either a feature phone or a smart phone; a tablet computer; a wearable computing device such as a smart watch or smart glasses; a personal digital assistant; a laptop computer and so on. The second entity device (624) may also have an appropriate mobile software application resident therein and installed thereon which may enable the second entity device (624) to transmit data messages to and receive data messages from the second server computer (620). In other embodiments, the second entity device (624) may exchange data messages with the second server computer (620) using Unstructured Supplementary Service Data (USSD) sessions or Short Messaging Service (SMS) messages. In some embodiments, the second entity device (624) may be a merchant operated mobile communications device, a point-of-sales device, an e-commerce portal or the like.

By enabling the first entity device (614) to exchange messages with the first server computer (610), the first entity (612) may be able to use the first entity device (614) to transact against a financial account (618) of the first entity controlled by the first server computer (610).

The first entity may be able to initiate transactions in favor of the second entity's financial account (628) by providing the second entity's payment information. The second entity may provide its payment information to the first entity (612) by various means in the form of a token as described herein.

In response to receiving a request to initiate a transfer of funds in favor of the second entity's financial account (628), the first server computer (610) transmits a transaction request message, including the second entity identifier or the second entity identifier converted to the second entity's primary account number, to the second server computer (620) in order to debit the first entity account (618).

A transaction request message may be any suitable message transmitted from the first server computer (610) to the second server computer (620) through the payment processing network (630). A transaction request message may in the standard ISO 8583 messaging format, or in any other suitable financial system transaction messaging format.

In some embodiments, the transaction request message can be an OCT (Original Credit Transaction) type message. An OCT transaction is typically a clearing and settlement credit transaction designed for use in business applications such as a business money transfer or business-to-consumer repayments.

The second entity identifier may include an issuer identification number (IIN) which is usable by the payment processing network (630) in identifying an appropriate financial institution (e.g. 626) to which the transaction request message is to be transmitted.

The first entity (612) may similarly have a first entity identifier associated therewith. The first entity identifier may include an issuer identification number (IIN) which is usable by the payment processing network (630) in identifying a financial institution (e.g. 616) associated with the first entity (612).

The transaction request message may thus be routed from the payment processing network (630) to the second server computer (620). The second server computer (620) credits the second entity's financial account (628) and transmits a transaction response message, either confirming or denying the transaction, to the first server computer (610) via the payment processing network (630).

The first and second entities may be a payor and payee who may undertake person to person payment transactions.

In another embodiment, the first entity may be a consumer operating a first entity device being a mobile communications device. The first server computer may be, or may be a part of a payment processor, maintained or operated by an issuing financial institution controlling the financial account of the consumer. The second entity may be a merchant operating a second entity device being, for example, a point-of-sales (POS) device. The second server computer may be, or may be a part of a payment processor, maintained or operated by an acquiring financial institution controlling the financial account of the merchant. In some embodiments, the POS device is a mobile communications device of the merchant.

Figure 7:
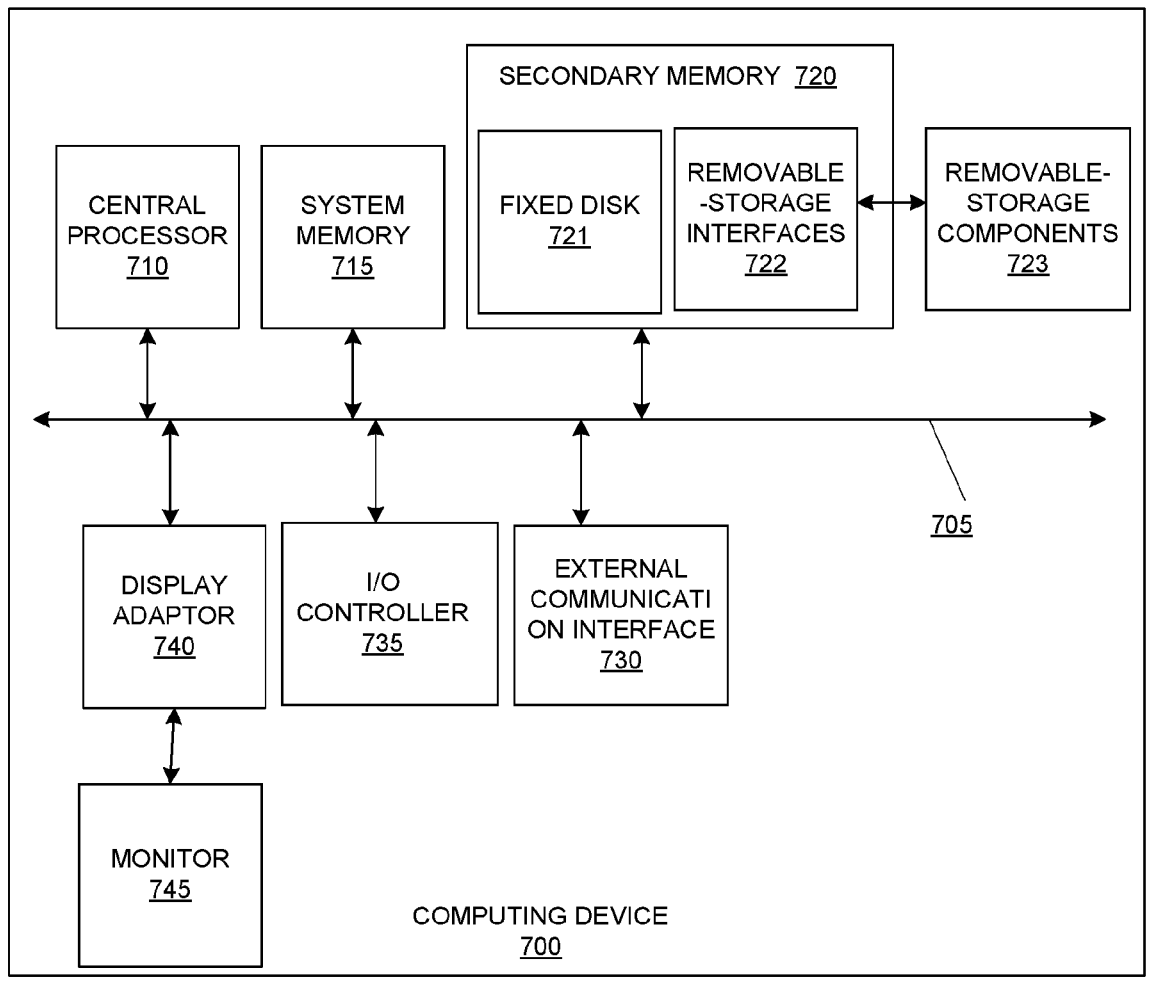
FIG. 7 illustrates an example of a computing device in which various aspects of the disclosure may be implemented.

FIG. 7 illustrates an example of a computing device (700) in which various aspects of the disclosure may be implemented. The computing device (700) may be suitable for storing and executing computer program code. The various participants and elements in the previously described system diagrams may use any suitable number of subsystems or components of the computing device (700) to facilitate the functions described herein.

The computing device (700) may include subsystems or components interconnected via a communication infrastructure (705) (for example, a communications bus, a cross-over bar device, or a network). The computing device (700) may include at least one central processor (710) and at least one memory component in the form of computer-readable media.

The memory components may include system memory (715), which may include read only memory (ROM) and random access memory (RAM). A basic input/output system (BIOS) may be stored in ROM. System software may be stored in the system memory (715) including operating system software. The memory components may also include secondary memory (720). The secondary memory (720) may include a fixed disk (721), such as a hard disk drive, and, optionally, one or more removable-storage interfaces (722) for removable-storage components (723).

The removable-storage interfaces (722) may be in the form of removable-storage drives (for example, magnetic tape drives, optical disk drives, floppy disk drives, etc.) for corresponding removable storage-components (for example, a magnetic tape, an optical disk, a floppy disk, etc.), which may be written to and read by the removable-storage drive. The removable-storage interfaces (722) may also be in the form of ports or sockets for interfacing with other forms of removable-storage components (723) such as a flash memory drive, external hard drive, or removable memory chip, etc.

The computing device (700) may include an external communications interface (730) for operation of the computing device (700) in a networked environment enabling transfer of data between multiple computing devices (700). Data transferred via the external communications interface (730) may be in the form of signals, which may be electronic, electromagnetic, optical, radio, or other types of signal. The external communications interface (730) may enable communication of data between the computing device (700) and other computing devices including servers and external storage facilities. Web services may be accessible by the computing device (700) via the communications interface (730). The external communications interface (730) may also enable other forms of communication to and from the computing device (700) including, voice communication, near field communication, Bluetooth, etc.

Computer-readable media in the form of the various memory components may provide storage of computer-executable instructions, data structures, program modules, and other data. A computer program product may be provided by a computer-readable medium having stored computer-readable program code executable by the central processor (710). A computer program product may be provided by a non-transient computer-readable medium, or may be provided via a signal or other transient means via the communications interface (730).

Interconnection via the communication infrastructure (705) allows a central processor (710) to communicate with each subsystem or component and to control the execution of instructions from the memory components, as well as the exchange of information between subsystems or components.

Peripherals (such as printers, scanners, cameras, or the like) and input/output (I/O) devices (such as a mouse, touchpad, keyboard, microphone, joystick, or the like) may couple to the computing device (700) either directly or via an I/O controller (735). These components may be connected to the computing device (700) by any number of means known in the art, such as a serial port. One or more monitors (745) may be coupled via a display or video adapter (740) to the computing device (700).

Figure 8:
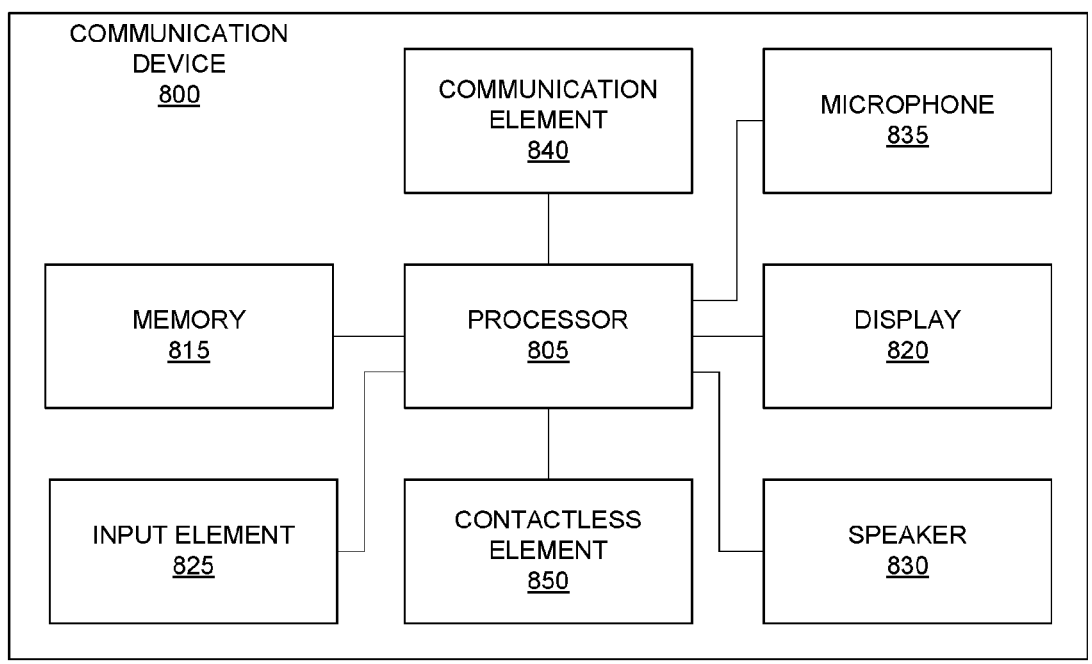
FIG. 8 shows a block diagram of a communication device that may be used in embodiments of the disclosure.

FIG. 8 shows a block diagram of a communication device (800) that may be used in embodiments of the disclosure. The communication device (800) may be a cell phone, a feature phone, a smart phone, a satellite phone, or a computing device having a phone capability.

The communication device (800) may include a processor (805) (e.g., a microprocessor) for processing the functions of the communication device (800) and a display (820) to allow a user to see the phone numbers and other information and messages. The communication device (800) may further include an input element (825) to allow a user to input information into the device (e.g., input buttons, touch screen, etc.), a speaker (830) to allow the user to hear voice communication, music, etc., and a microphone (835) to allow the user to transmit his or her voice through the communication device (800). The processor (810) of the communication device (800) may connect to a memory (815). The memory (815) may be in the form of a computer-readable medium that stores data and, optionally, computer-executable instructions.

The communication device (800) may also include a communication element (840) for connection to communication channels (e.g., a cellular telephone network, data transmission network, Wi-Fi network, satellite-phone network, Internet network, Satellite Internet Network, etc.). The communication element (840) may include an associated wireless transfer element, such as an antenna. The communication element (840) may include a subscriber identity module (SIM) in the form of an integrated circuit that stores an international mobile subscriber identity and the related key used to identify and authenticate a subscriber using the communication device (800). One or more subscriber identity modules may be removable from the communication device (800) or embedded in the communication device (800).

The communication device (800) may further include a contactless element (850), which is typically implemented in the form of a semiconductor chip (or other data storage element) with an associated wireless transfer element, such as an antenna. The contactless element (850) may be associated with (e.g., embedded within) the communication device (800) and data or control instructions transmitted via a cellular network may be applied to the contactless element (850) by means of a contactless element interface (not shown). The contactless element interface may function to permit the exchange of data and/or control instructions between mobile device circuitry (and hence the cellular network) and the contactless element (850).

The contactless element (850) may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device (800) and an interrogation device. Thus, the communication device (800) may be capable of communicating and transferring data and/or control instructions via both a cellular network and near field communications capability.

The data stored in the memory (815) may include: operation data relating to the operation of the communication device (800), personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from the communication device (800) to selected receivers.

The communication device (800) may be, amongst other things, a notification device that can receive alert messages and access reports, a portable merchant device that can be used to transmit control data identifying a discount to be applied, as well as a portable consumer device that can be used to make payments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

What is claimed is:

1. A method for management of payee information, the method performed at a payee information management application on a mobile communication device and including the steps of:
   receiving a token including information relating to a payee, the information including payment information enabling processing of a transaction to a financial account of the payee;
   storing the token or extracted payment information from the token on the mobile communication device in a secure storage element associated with the payee information management application; and
   transferring, by the payee information management application on the mobile communication device to a payment application operating on the mobile communication device, the payment information, the payment application operable to process payment to the payee using the payment information, the payment application being different from the payee information management application,
   wherein the payment information for each of multiple payees is stored and transferred, by the payee information management application, to the payment application on the mobile communication device when required.

2. The method as claimed in claim 1, including extracting the payment information from the token by decrypting and/or analyzing the token.

3. The method as claimed in claim 1, wherein the extracted payment information is stored in a standardized format for the payee information management application or in a format accessible by the payment application.

4. The method as claimed in claim 1, wherein transferring the payment information to the payment application includes formatting and/or encrypting the payment information according to requirements of the payment application.

5. The method as claimed in claim 1, including, prior to transferring the payment information, establishing a secure communications channel with the payment application over which to transfer the payment information.

6. The method as claimed in claim 1, including comparing the token or the extracted payment information from the token with an existing stored token or extracted payment information, and updating the stored token or extracted payment information if different.

7. The method as claimed in claim 1, including receiving a request for payment information of the payee from the payment application operating on the mobile communication device.

8. The method as claimed in claim 1, including instigating a payment to a payee from the payee information management application including receiving selection of the payment application and transferring the payment information for the payee to the payment application.

9. The method as claimed in claim 1, wherein the token is a graphical code encoding an account number and one or more from a group consisting of: a name of the payee, a city of the payee, a country of the payee, a currency of the transaction, a payment amount.

10. The method as claimed in claim 1, including generating a graphical code to encode payment information of a user of the payee information management application for providing to another user.

11. The method as claimed in claim 1, including extracting the payment information from the token including extracting a name or identifier of the payee and referencing the payment information by the name or identifier.

12. The method as claimed in claim 1, including mapping names or identifiers of payees from payment applications to names or identifiers stored at the payee information management application.

13. The method as claimed in claim 1, including registering one or more payment applications with the payee information management application including receiving format and/or encryption requirements for the payment application.

14. The method as claimed in claim 1, wherein receiving the token includes receiving the token from a source outside the mobile communication device using a receiving component of the mobile communication device or receiving the token from another component within the mobile communication device.

15. A system for management of payee information using a mobile communication device comprising a processor and a non-transitory computer readable medium storing instructions which, when executed by the processor, causes the processor to perform:
   receiving a token including information relating to a payee, the information including payment information enabling processing of a transaction to a financial account of the payee;
   storing the token or extracted payment information from the token on the mobile communication device in a secure storage element associated with a payee information management application; and
   transferring, by the payee information management application on the mobile communication device to a payment application operating on the mobile communication device, the payment information, the payment application operable to process payment to the payee using the payment information, the payment application being different from the payee information management application,
   wherein the payment information for each of multiple payees that is stored and transferred, by the payee information management application, to the payment application on the mobile communication device when required.

16. The system as claimed in claim 15, wherein the payee information management application is embedded in the payment application.

17. The system as claimed in claim 15, wherein the instructions further cause performance of extracting the payment information from the token by decrypting or analyzing the token.

18. The system as claimed in claim 15, wherein extracted payment information is stored in a standardized format for the payee information management application or a format accessible by the payment application.

* * * * *